United States Patent
Honda

(10) Patent No.: US 9,871,698 B2
(45) Date of Patent: Jan. 16, 2018

(54) INFORMATION PROCESSING DEVICE

(71) Applicant: NEC Corporation, Minato-ku, Tokyo (JP)

(72) Inventor: Kazutoshi Honda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 153 days.

(21) Appl. No.: 14/440,144

(22) PCT Filed: Oct. 17, 2013

(86) PCT No.: PCT/JP2013/006155
§ 371 (c)(1),
(2) Date: May 1, 2015

(87) PCT Pub. No.: WO2014/068877
PCT Pub. Date: May 8, 2014

(65) Prior Publication Data
US 2015/0295753 A1 Oct. 15, 2015

(30) Foreign Application Priority Data
Nov. 2, 2012 (JP) .................................. 2012-242441

(51) Int. Cl.
*G06F 15/177* (2006.01)
*H04L 12/24* (2006.01)
(Continued)

(52) U.S. Cl.
CPC ........ *H04L 41/082* (2013.01); *H04L 67/1095* (2013.01); *H04L 47/25* (2013.01)

(58) Field of Classification Search
CPC ... H04L 41/082; H04L 47/25; H04L 67/1095; H04L 12/24; H04L 12/825
See application file for complete search history.

(56) References Cited

U.S. PATENT DOCUMENTS

| | | | |
|---|---|---|---|
| 7,093,000 B1 * | 8/2006 | Yamagishi | H04H 20/16 348/E7.07 |
| 2006/0200502 A1 * | 9/2006 | Tanaka | G06F 8/665 |
| 2013/0346363 A1 * | 12/2013 | Arakawa | G06F 17/30575 707/610 |

FOREIGN PATENT DOCUMENTS

| | | |
|---|---|---|
| JP | H11272533 A | 10/1999 |
| JP | 2003015926 A | 1/2003 |

(Continued)

OTHER PUBLICATIONS

International Search Report for PCT Application No. PCT/JP2013/006155, dated Jan. 21, 2014.
English Translation of written opinion for PCT/JP2013/006155.

*Primary Examiner* — Cheikh Ndiaye

(57) ABSTRACT

An information processing device in the present invention includes: an updating means for acquiring update information, updating data pre-stored in a storage unit, and acquiring difference information between the pre-update data and the post-update data; a communication state acquisition means for acquiring a communication state of each of a plurality of communication channels to communicate with another information processing device storing the pre-update data; a difference information splitting means for, based on the communication state of each of the plurality of communication channels acquired by the communication state acquisition means, splitting the difference information, which is acquired by the updating means, so as to be related with each of the communication channels; and a transmission means for transmitting pieces of the difference information split by the difference information splitting means to the another information processing device through the communication channels related with the pieces of the split difference information, respectively.

7 Claims, 12 Drawing Sheets

(51) Int. Cl.
*H04L 29/08* (2006.01)
*H04L 12/825* (2013.01)

(56) References Cited

FOREIGN PATENT DOCUMENTS

| | | |
|---|---|---|
| JP | 2004535631 A | 11/2004 |
| JP | 2008293218 A | 12/2008 |

* cited by examiner

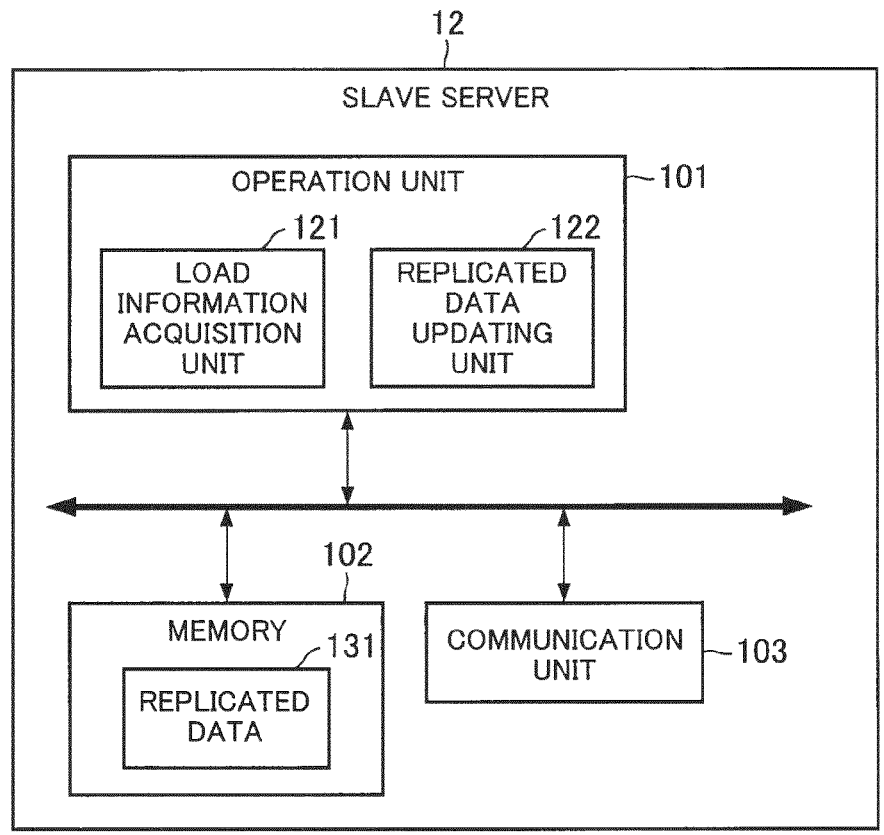

Fig. 5
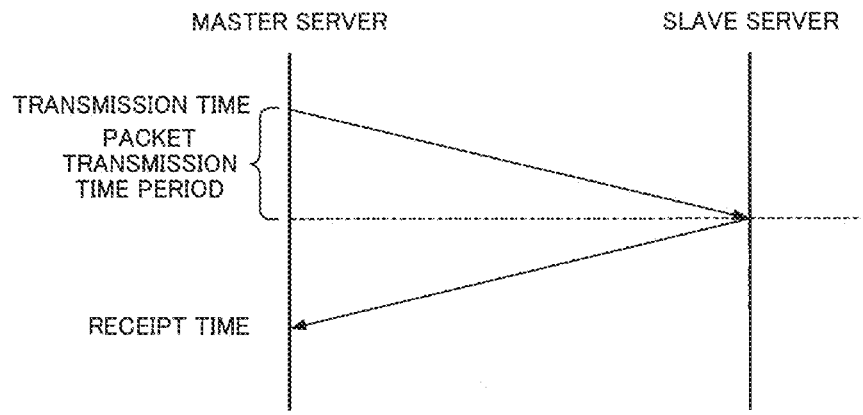
Fig. 6
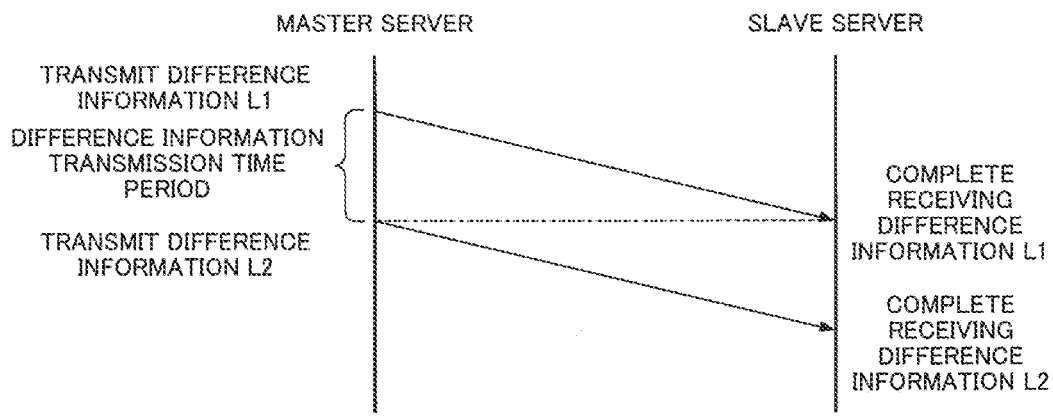
Fig. 7
| DIFFERENCE INFORMATION | SIZE OF DIFFERENCE INFORMATION | MASTER SERVER SLAVE SERVER | DIFFERENCE INFORMATION TRANSMISSION TIME | SLAVE SERVER RECEIPT TIME |
|---|---|---|---|---|
| L1 | 100B | 12:00:00 | 1sec | 12:00:01 |
| L2 | 200B | 12:00:01 | 2sec | 12:00:03 |
| L3 | 100B | 12:00:03 | 1sec | 12:00:04 |

INFORMATION PROCESSING DEVICE

This application is a National Stage Entry of PCT/JP2013/006155 filed on Oct. 17, 2013, which claims priority from Japanese Patent Application 2012-242441 filed on Nov. 2, 2012, the contents of all of which are incorporated herein by reference, in their entirety.

TECHNICAL FIELD

The present invention relates to an information processing device, and in particular, relates to an information processing device that transmits difference information when updating data to another information processing device.

BACKGROUND ART

A memory database technology to store data in a memory and perform processing has been known as a memory capacity is increased. Such a memory database system technology includes a master server that stores data and a slave server that stores a replica of the data so as to bring redundancy to the data (for example, refer to PTL 1).

CITATION LIST

[Patent Literature]
PTL 1: Japanese Unexamined Patent Application Publication No. 2008-293218

SUMMARY OF INVENTION

Technical Problem

In the above-described memory database system technology, since data is stored in a memory, there is no need to access a disk, and it is possible to access the data at high speed. On the other hand, when data stored in the master server is updated, processing time to transmit an updated log associated with the data update to the slave server becomes longer compared with update time of the data in the memory. As a result, there has been a problem in that it takes a long time for processing of transmitting difference information (updated log) associated with the data update to the slave server. Also in a storage device such as a hard disk drive, there has been a possibility that the same problem occurs owning to the speeding up of access.

Therefore, it is an object of the present invention to provide an information processing device capable of solving a problem in that it takes a long time to transmit difference information.

Solution to Problem

In order to achieve the above-described object, an information processing device that is one mode of the present invention has a configuration including:

an updating means for acquiring update information, updating data pre-stored in a storage unit, and acquiring difference information between the pre-update data and the post-update data;

a communication state acquisition means for acquiring a communication state of each of a plurality of communication channels to communicate with another information processing device storing the pre-update data;

a difference information splitting means for, based on the communication state of each of the plurality of communication channels acquired by the communication state acquisition means, splitting the difference information, which is acquired by the updating means, so as to be related with each of the communication channels; and a transmission means for transmitting pieces of the difference information split by the difference information splitting means to the another information processing device through the communication channels related with the pieces of the split difference information, respectively.

In addition, a program that is another mode of the present invention is a program, in an information processing device, for achieving:

an updating means for acquiring update information, updating data pre-stored in a storage unit, and acquiring difference information between the pre-update data and the post-update data;

a communication state acquisition means for acquiring a communication state of each of a plurality of communication channels to communicate with another information processing device storing the pre-update data;

a difference information splitting means for, based on the communication state of each of the plurality of communication channels acquired by the communication state acquisition means, splitting the difference information, which is acquired by the updating means, so as to be related with each of the communication channels; and a transmission means for transmitting each of pieces of the difference information split by the difference information splitting means to the another information processing device through the communication channels related with the pieces of the split difference information, respectively.

In addition, an information processing method that is another mode of the present invention has a configuration including:

acquiring update information, updating data pre-stored in a storage unit, and acquiring difference information between the pre-update data and the post-update data;

acquiring a communication state of each of a plurality of communication channels to communicate with another information processing device storing the pre-update data;

based on the acquired communication state of each of the plurality of communication channels, splitting the acquired difference information so as to be related with each of the communication channels; and transmitting pieces of the split difference information to the another information processing device through the communication channels related with the pieces of the difference information split while being associated with each of the communication channels, respectively.

Advantageous Effects of Invention

By being configured as described above, the present invention has a beneficial effect of capable of quickly transmitting difference information associated with data update.

BRIEF DESCRIPTION OF DRAWINGS

FIG. 3 is a block diagram illustrating a structure of a slave server in the first exemplary embodiment of the present invention.

FIG. 4 is a diagram for explaining a transmission management table.

FIG. 5 is a diagram for explaining packet transmission time.

FIG. 6 is a diagram for explaining difference information transmission time.

FIG. 7 is a diagram for explaining processing for transmitting difference information.

DESCRIPTION OF EMBODIMENTS

<First Exemplary Embodiment>

A first exemplary embodiment of the present invention will be described with reference to FIG. 1 to FIG. 14. FIG. 1 to FIG. 7 are diagrams for explaining a structure of a communication system 1. FIG. 8 to FIG. 14 are diagrams for explaining an operation of the communication system 1.

[Structure]

Figure 1:
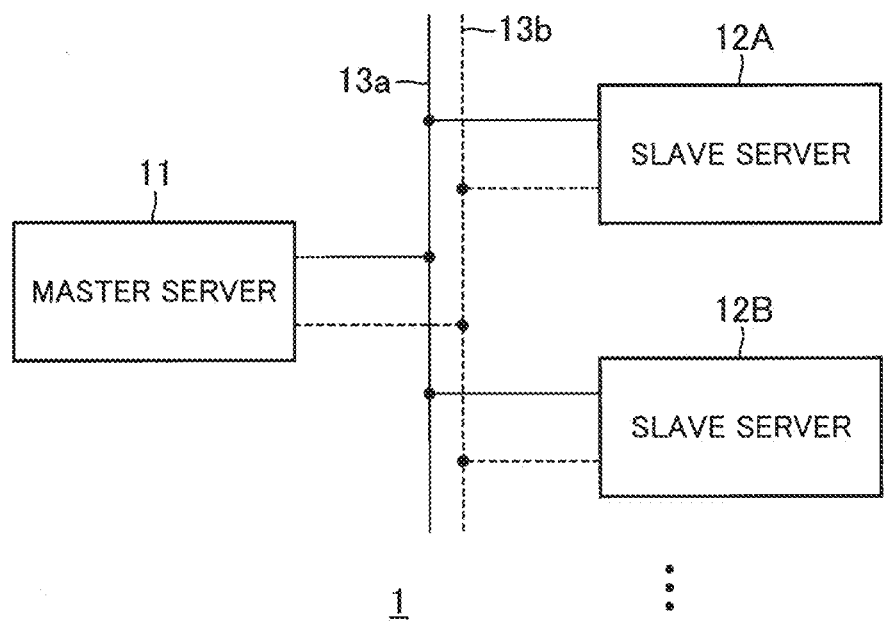
FIG. 1 is a block diagram illustrating a structure of a communication system of the present invention.

First, the structure of the communication system 1 will be described. As illustrated in FIG. 1, the communication system 1 in the present exemplary embodiment includes a master server 11, slave servers 12A and 12B, and communication channels 13*a* and 13*b*. The master server 11 is a server device using a memory database system in which data is stores in a memory. The master server 11 stores data in the memory, and thus, does not need to access a storage device such as a hard disk drive and can access the data at high speed.

The slave servers 12A and 12B are server devices that store replicas of the data stored in the master server 11. The slave servers 12A and 12B store the replicas of the data stored in the master server 11 so that functioning of the entire communication system 1 can be maintained even if failures or the like occur in the master server 11. In the case where the slave servers 12A and 12B are not individually distinguished, hereinafter, they will be simply referred to as the slave server 12.

The master server 11 and the slave server 12 are connected through the communication channels 13*a* and 13*b* by wired or wireless connection. In the case where the communication channels 13*a* and 13*b* are not individually distinguished, hereinafter, they will be simply referred to as the communication channel 13.

The communication system 1 of FIG. 1 may include one slave server 12 or three or more plural slave servers 12. Furthermore, the number of the communication channels 13 in the communication system 1 may be plural of three or more.

Figure 2:
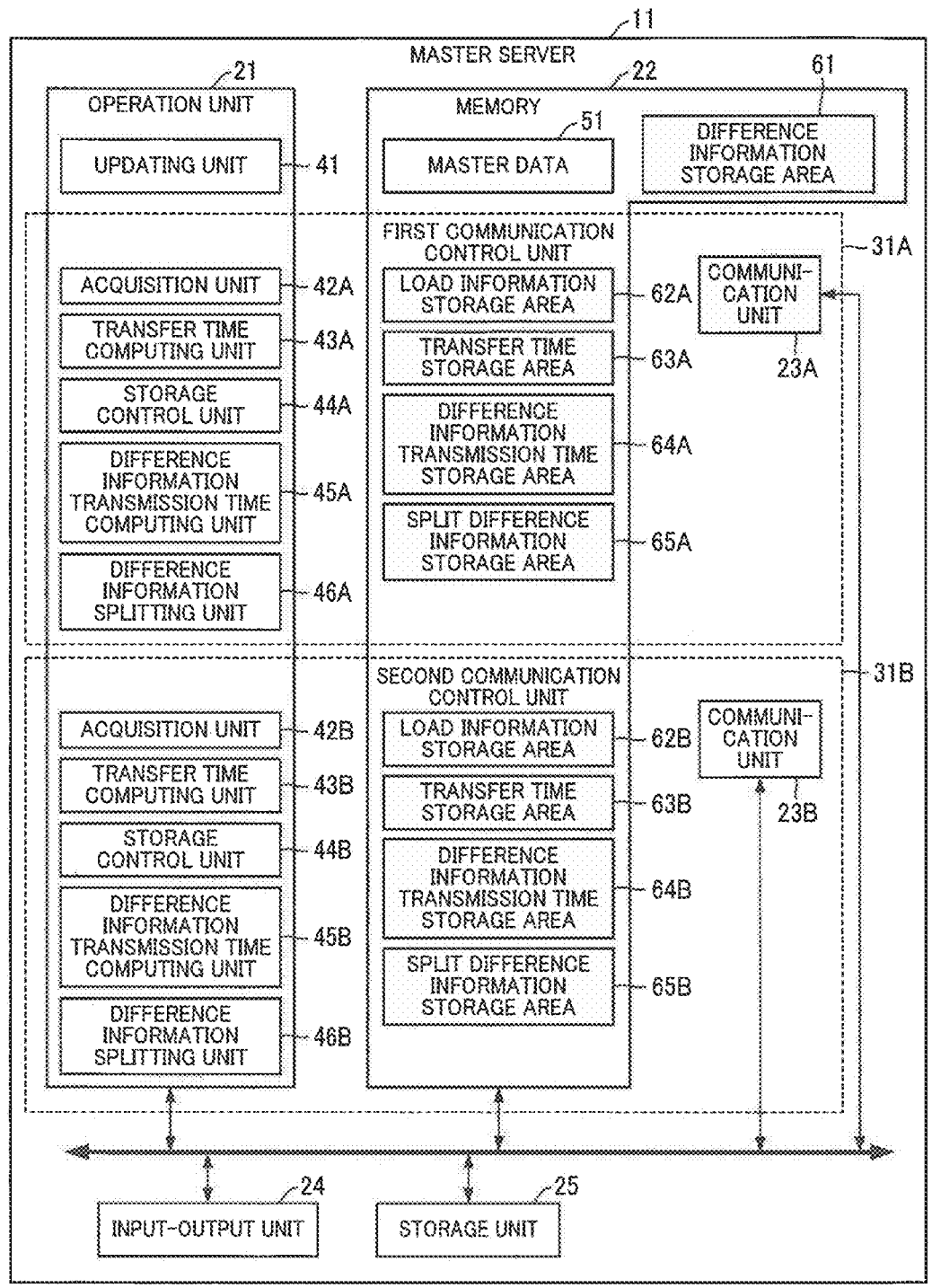
FIG. 2 is a block diagram illustrating a structure of a master server in a first exemplary embodiment of the present invention.
Figure 8:
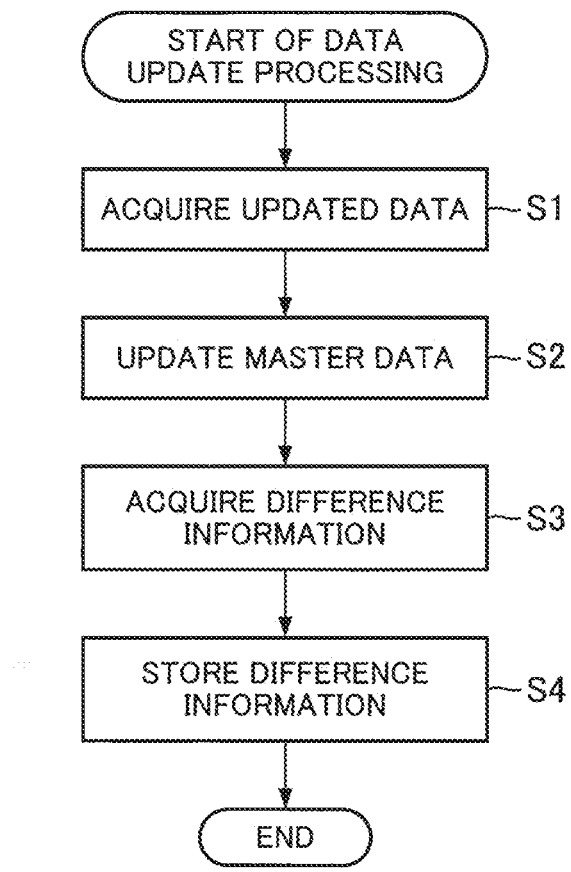
FIG. 8 is a flowchart for explaining data update processing.

First, a structure of the master server 11 will be described with reference to FIG. 2. The master server 11 (information processing device) includes an operation unit 21, a memory 22, communication units 23A and 23B (transmission means), an input-output unit 24, and a storage unit 25.

The operation unit 21 is configured by a CPU (Central Processing Unit), for example. The operation unit 21 executes various functions for controlling the master server 11 by reading a program stored in the storage unit 25 and executing the program using the memory 22 as a work area.

The operation unit 21 has an updating unit 41 (updating means), acquisition units 42A and 42B, transfer time computing units 43A and 43B (communication state acquisition means), storage control units 44A and 44B, difference information transmission time computing units 45A and 45B (difference information transmission time computing means), and difference information splitting units 46A and 46B (difference information splitting means) by executing the program. Each structure of the operation unit 21 will be described below.

In addition, the memory 22 (storage unit) stores master data 51 which is data that the master server 11 has. The master data 51 is, for example, a database to manage receiving orders and delivering of products, a database to manage online securities, or the like, and particularly used in a system requiring a high-speed transaction. Furthermore, the memory 22 has a difference information storage area 61, load information storage areas 62A and 62B, transfer time storage areas 63A and 63B, difference information transmission time storage areas 64A and 64B, and split difference information storage areas 65A and 65B. Each storage area of the memory 22 will be described below.

The master server 11 has a first communication control unit 31A for controlling communication with the slave server 12A, and a second communication control unit 31B for controlling communication with the slave server 12B. The first communication control unit 31A has the acquisition unit 42A, the transfer time computing unit 43A, the storage control unit 44A, the difference information transmission time computing unit 45A, the difference information splitting unit 46A, the load information storage area 62A, the transfer time storage area 63A, the difference information transmission time storage area 64A, and the split difference information storage area 65A.

The second communication control unit 31B has the acquisition unit 42B, the transfer time computing unit 43B, the storage control unit 44B, the difference information transmission time computing unit 45B, the difference information splitting unit 46B, the load information storage area 62B, the transfer time storage area 63B, the difference information transmission time storage area 64B, and the split difference information storage area 65B. When the number of the slave servers 12 is 1, the master server 11 has only the first communication control unit 31A. In addition, when the number of the slave servers 12 is plural of three or more, the master server 11 has the communication control units 31 equal to the number of slave servers 12. Hereinafter, the acquisition units 42A and 42B will be referred to as the acquisition unit 42. In addition, other structures having codes A and B will be referred without distinguishing between A and B.

Next, a structure of the slave server 12 will be described with reference to FIG. 3. The slave server 12 (another information processing device) includes an operation unit 101, a memory 102, and a communication unit 103. The operation unit 101 is configured by a CPU, for example. The operation unit 101 executes various functions for controlling the slave server 12 by reading a program stored in a storage unit (not shown in the diagram) and executing the program by using the memory 102 as a work area.

The operation unit 101 of the slave server 12 has a load information acquisition unit 121 and a replicated data updating unit 122 by executing the program. Each structure of the operation unit 101 will be described below. In addition, the memory 102 stores replicated data 131 which is a replica of the master data 51 that the master server 11 stores.

The slave server 12 may further include a replicated data output unit that outputs (displays) the replicated data 131. If the slave server 12 includes the replicated data output unit, it becomes possible for a user to access the slave server 12 and refer to the replicated data 131. Therefore, output processing of the master data 51 (replicated data 131) can be distributed to each of the master server 11 and the slave server 12, and a load increase owning to access concentration to the master server 11 can be prevented.

Hereinafter, details of each structure of the master server 11 and the slave server 12 will be described. First, processing in the case of updating the master data 51 will be described.

In the case of updating the master data 51 of the master server 11, first, the updating unit 41 acquires updated data. For example, the updating unit 41 acquires updated data inputted by a user through the input-output unit 24. Next, the updating unit 41 updates the master data 51 stored in the memory 22, on the basis of the acquired updated data. Furthermore, the updating unit 41 generates and acquires difference information (for example, updated log) between the pre-update master data and the post-update master data, on the basis of the pre-update master data and the post-update master data. Then, the updating unit 41 stores the acquired difference information in the difference information storage area 61. Accordingly, every time the master data 51 stored in the memory 22 is updated, the difference information is automatically generated.

At this time, the updating unit 41 stores a transmitted flag that indicates whether or not the difference information has already been transmitted to the slave server 12, in the memory 22 (or the storage unit 25) storing a transmission management table 81 set in each of the slave servers. FIG. 4 is a diagram illustrating an example of the transmission management table 81. As illustrated in FIG. 4, in the transmission management table 81, transmitted flags that indicate whether or not each of pieces of difference information L1 to L3 has already been transmitted to the slave servers 12A and 12B are set in the transmission management table 81. In the example of FIG. 4, when a piece of the difference information has already been transmitted, "1" is set as the transmitted flag. In addition, when a piece of the difference information is not transmitted, "0" is set as the transmitted flag.

Therefore, the transmission management table 81 of FIG. 4 indicates that the difference information L1 has already been transmitted to each of the slave servers 12A and 12B. In addition, the transmission management table 81 indicates that the difference information L2 has already been transmitted to the slave server 12A and is not transmitted to the slave server 12B. Furthermore, the transmission management table 81 indicates that the difference information L3 is not transmitted to each of the slave servers 12A and 12B.

Next, preprocessing of transmitting the difference information of the updated master data 51 to the slave server 12 will be described. In the case of transmitting the difference information to the slave server 12, the master server 11 initially acquires a communication state of the slave server 12.

First, the acquisition unit 42 of the master server 11 acquires transmission destination information. The transmission destination information is, for example, address information of the slave server 12 and information of a plurality of communication channels for communicating with the slave server 12, and is pre-stored in the storage unit 25. Next, the communication unit 23 of the master server 11 transmits a load information request to the slave server 12 via each of the communication channels (for example, the communication channels 13a and 13b) included in the acquired transmission destination information. The load information request is information for requesting load information (for example, CPU utilization) of the slave server 12.

Subsequently, the acquisition unit 42 of the master server 11 acquires transmission time that indicates time when transmitting the load information request, for each of the communication channels. The acquisition unit 42 acquires the transmission time from, for example, a clock embedded in the master server 11. Then, the storage control unit 44 stores the transmission time that the acquisition unit 42 acquired, in the memory 22. In the case of transmitting the load information requests to be transmitted via the respective communication channels at the same timing, the acquisition unit 42 acquires one communication time as the transmission time for each of the communication channels.

Here, processing of the slave server 12 when the load information request is transmitted to the slave server 12 by the communication unit 23 of the master server 11 will be described. First, the communication unit 103 of the slave server 12 receives the load information request transmitted from the master server 11. Subsequently, the load information acquisition unit 121 of the slave server 12 acquires load information (for example, CPU utilization). Specifically, when receiving the load information request from the master server 11, the load information acquisition unit 121 detects a load and acquires load information. Without limiting to the above, the load information acquisition unit 121 may detect a load at arbitrary timing (for example, regularly), store the detected load information in the memory 102, and acquire the stored load information when receiving the load information request from the master server 11.

Then, the communication unit 103 of the slave server 12 transmits the acquired load information to the master server 11 through the communication channel through which the load information request has been received. Accordingly, the master server 11 can acquire the load of the slave server 12.

When the load information is transmitted from the slave server 12, the communication unit 23 of the master server 11 receives the load information transmitted via each of the communication channels. Subsequently, the storage control unit 44 of the master server 11 stores the received load information in the load information storage area 62. In addition, the acquisition unit 42 of the master server 11 acquires receipt time that indicates time when receiving the load information, for each of the communication channels.

Then, the transfer time computing unit 43 of the master server 11 computes a transfer time period for each of the communication channels on the basis of the transmission time for each of the communication channels, the receipt time for each of the communication channels, and the size of the load information. Specifically, the transfer time period is computed using the following equations (1) and (2), for each of the communication channels. First, the transfer time computing unit 43 computes a packet transmission time period on the basis of the transmission time of the load information request and the receipt time of the load information. The packet transmission time period (sec) is computed by the following equation (1).

Packet Transmission Time Period (Receipt Time−Transmission Time)÷2     (1)

More specifically, the packet transmission time period is represented by a half of the difference obtained by subtracting the transmission time from the receipt time, as illustrated in FIG. 5. For example, when the transmission time is "12:00:00" and the receipt time is "12:00:02", the packet transmission time period is "1" (=2÷2) (sec). In the case where the sizes of the load information request that the master server 11 transmits and the load information that the slave server 12 transmits are different, the ratio of the size of the load information request to the size of the load information may be included in the equation (1). For example, when the ratio of the size of the load information request to the size of the load information is 1:2, the transfer time computing unit 43 can compute the packet transmission time period by (receipt time−transmission time)÷3 (=1+2).

Subsequently, the transfer time computing unit 43 computes the transfer time period (sec/bytes) by the following equation (2).

Transfer Time Period=Packet Transmission Time Period÷Packet Size     (2)

More specifically, the transfer time computing unit 43 computes the transfer time period by dividing the packet transmission time period by the packet size. For example, when the packet size is 10 B, the transfer time period is "0.1" (=1÷10) (sec). As described above, in the case where the size of the load information request and the size of the load information are different, the transfer time computing unit 43 can compute the transfer time period by using one packet size of the size of the load information request and the size of the load information.

Finally, the storage control unit 44 stores the computed transfer time period for each of the communication channels in the transfer time storage area 63. Accordingly, the transfer time period for each of the communication channels from the master server 11 to the slave server 12 can be acquired as the communication state of the slave server 12. The communication state of the slave server 12 is not limited to the above-described transfer time period.

Next, processing in which the master server 11 computes difference information transmission time period will be described. First, the acquisition unit 42 acquires the transfer time period for each of the communication channels. Specifically, the acquisition unit 42 acquires the transfer time period for each of the communication channels stored in the transfer time storage area 63. Next, the difference information transmission time computing unit 45 computes the difference information transmission time period on the basis of the acquired transfer time period for each of the communication channels.

Specifically, the transfer time period is computed using the following equations (3) and (4), for each of the communication channels. First, the transfer time computing unit 43 computes a total network bandwidth of the communication channels 13a and 13b (communication speed of the entire communication channels). The total network bandwidth (bytes/sec) is computed by the following equation (3).

Total Network Bandwidth=(1÷Transfer Time Period for Communication Channel 13a)+(1÷Transfer Time Period for Communication Channel 13b)     (3)

More specifically, the transfer time computing unit 43 computes the total network bandwidth by the sum of inverses of the transfer time period for the respective communication channels. For example, when the transfer time period of the communication channel 13a is "0.1" sec and the transfer time period of the communication channel 13b is "0.05" sec, the total network bandwidth is "30" (=10+20) (bytes/sec). Subsequently, the transfer time computing unit 43 computes the difference information transmission time period (sec) of difference information Ln by the following equation (4).

Difference Information Transmission Time Period=Difference Information Size÷Total Network Bandwidth     (4)

More specifically, the transfer time computing unit 43 computes the difference information transmission time period by dividing the size of the difference information Ln by the total network bandwidth. For example, when the size of the difference information Ln is 90 B, the difference information transmission time period is "3" (=90÷30) (sec). Then, the storage control unit 44 stores the computed difference information transmission time period in the difference information transmission time storage area 64. Accordingly, the difference information transmission time period until the difference information is transmitted from the master server 11 to the slave server 12 is computed, and therefore, after completing transmission of certain difference information, next difference information can be immediately transmitted.

The difference information transmission time computing unit 45 can acquire the load information from the load information storage area 62 and compute the difference information transmission time period depending on the magnitude of the load indicated by the load information (for example, CPU utilization). For example, the difference information transmission time computing unit 45 computes the difference information transmission time period such that the difference information transmission time period becomes longer as the magnitude of the load becomes bigger.

In addition, for example, when the magnitude of the load indicated by the load information is a pre-set threshold value or more (for example, 100% or more), the difference information transmission time computing unit 45 can add pre-set time (for example, 0.2 sec) to the computed difference information transmission time period. Accordingly, in the case where the replicated data 131 may not be able to be updated in the slave server 12, the load with respect to the slave server 12 can be reduced.

Next, processing in which the master server 11 splits the difference information will be described. First, the difference information splitting unit 46 refers to the difference information storage area 61 and determines whether or not there is unsplit difference information Ln. When there is the unsplit difference information Ln, the difference information splitting unit 46 acquires the transfer time period for each of the communication channels from the transfer time storage area 63. Next, the difference information splitting unit 46 computes a transmission size of the difference information Ln for each of the communication channels. Specifically, the transmission size of the difference information is computed using the following equations (5) and (6), for each of the communication channels. The transmission size of the communication channel 13a is computed by the following equation (5).

$$\begin{aligned}&\text{Transmission Size of Communication Channel}\\&\quad\text{13}a\text{=Size of Difference Information}\times\text{Transfer}\\&\quad\text{Time Period for Communication Channel 13}b\text{+}\\&\quad\text{(Transfer Time Period for Communication}\\&\quad\text{Channel 13}a\text{+Transfer Time Period for Commu-}\\&\quad\text{nication Channel 13}b\text{)}\end{aligned} \quad (5)$$

More specifically, the difference information splitting unit 46 computes the transmission size for the communication channel 13a by dividing the transfer time period for the communication channel 13b that is different from (opposite to) the communication channel 13a by the sum of the transfer time periods for the communication channels 13a, 13b and by multiplying the value by the size of the difference information. For example, when the size of the difference information is 90 B, the transmission size for the communication channel 13a is "30" (=90×0.05÷0.15) B. Similarly, the transmission size for the communication channel 13b is computed by the following equation (6).

$$\begin{aligned}&\text{Transmission Size of Communication Channel}\\&\quad\text{13}b\text{=Size of Difference Information}\times\text{Transfer}\\&\quad\text{Time Period for Communication Channel 13}a\text{+}\\&\quad\text{(Transfer Time Period for Communication}\\&\quad\text{Channel 13}a\text{+Transfer Time Period for Commu-}\\&\quad\text{nication Channel 13}b\text{)}\end{aligned} \quad (6)$$

More specifically, the difference information splitting unit 46 computes the transmission size for the communication channel 13b by dividing the transfer time period for the communication channel 13a that is different from (opposite to) the communication channel 13b by the sum of the transfer time periods for the communication channels 13a and 13b and by multiplying the value by the size of the difference information. For example, when the size of the difference information is 90 B, the transmission size for the communication channel 13b is "60" (=90×0.1÷0.15) B. In this manner, on the basis of the ratio of the transfer time period for each of the communication channels (the transfer time period for communication channel 13a: the transfer time period for communication channel 13b=2:1), the difference information splitting unit 46 splits the difference information so as to be related with the communication channels (transmission size for communication channel 13a "30"B: transmission size for communication channel 13b "60"B). As described above, in the case where the number of the communication channels 13 is 2, after computing the transmission size for the communication channel 13a (30 B), by subtracting the computed transmission size for the communication channel 13a from the size of the difference information (90B), the difference information splitting unit 46 can compute the transmission size for the communication channel 13b (60 B=90 B−30 B).

Then, the difference information splitting unit 46 splits the difference information Ln so as to be related with each of the communication channels, on the basis of the computed transmission size for each of the communication channels. Finally, the storage control unit 44 stores the difference information Ln split so as to be related with each of the communication channels in the split difference information storage area 65. Accordingly, the difference information can be split so as to be related with each of the communication channels, and the difference information split to have a prefixed size for each of the communication channels can be transmitted.

In this manner, the difference information is split such that the size of the difference information becomes smaller as the transfer time period becomes longer and the size of the difference information becomes larger as the transfer time period becomes shorter, and thus, a communication channel having higher transmission capacity can transmit larger difference information, and the plurality of communication channels can be efficiently used.

The case where the number of the communication channels is 2 has been described above, but with respect to three or more plural communication channels, the difference information splitting unit 46 can compute the transmission size of the difference information to be transmitted via each of the communication channels. For example, when computing each of the transfer time periods for the plurality of communication channels 13, the difference information splitting unit 46 computes the transmission size, for each of the communication channels 13c and 13d, so as to be related with the communication channel 13c (one communication channel) that causes the shortest transfer time period and the communication channel 13d (another communication channel) that causes the longest transfer time period. Specifically, the transmission sizes for the communication channels 13c and 13d are computed by the following equations (7) and (8).

$$\begin{aligned}&\text{Transmission Size for One Communication}\\&\quad\text{Channel=Size of Difference Information}\times\text{Trans-}\\&\quad\text{fer Time Period for Another Communication}\\&\quad\text{Channel}\div\text{(Sum of Transfer Time Periods for}\\&\quad\text{Plurality of Communication Channels 13)}\end{aligned} \quad (7)$$

$$\begin{aligned}&\text{Transmission Size for Another Communication}\\&\quad\text{Channel=Size of Difference Information}\times\text{Trans-}\\&\quad\text{fer Time Period for One Communication Chan-}\\&\quad\text{nel}\div\text{(Sum of Transfer Time Periods for Plurality}\\&\quad\text{of Communication Channels 13)}\end{aligned} \quad (8)$$

More specifically, the difference information splitting unit 46 computes the transmission size for the one communication channel by dividing the transfer time period for the another communication channel (communication channel 13d) that is related with the one communication channel (communication channel 13c) by the sum of the transfer time periods for the plurality of communication channels 13 and by multiplying the value by the size of the difference information. In addition, similarly, the difference information splitting unit 46 computes the transmission size of the another communication channel by dividing the transfer time period for the one communication channel (communication channel 13c) that is related with the another communication channel (communication channel 13d) by the sum of the transfer time periods for the plurality of communication channels 13 and by multiplying the value by the size of the difference information.

More specifically, the difference information splitting unit 46 computes the transmission size for each of the communication channels 13 so as to relate the one communication channel whose transfer time period is the n-th (n is an integer) shortest and the another communication channel whose transfer time period is the n-th longest with each other. When the number of the communication channels 13 is an odd number (for example, 3), the one communication channel (for example, the communication channel 13 whose transfer time period is the second shortest) and the another communication channel (for example, the communication channel 13 whose transfer time period is the second longest) may be the same communication channel 13x. In this case, the transfer time period for the one communication channel is the same as the transfer time period for the another communication channel, and therefore, the difference information splitting unit 46 computes the transmission size for the communication channel 13x by using one of the following equations (7) and (8). In addition, the difference information splitting unit 46 may compute the transmission size for the communication channel 13x by subtracting the sum of the transmission sizes for other communication channels 13 that are different from the communication channel 13*x*, from the size of the difference information. The method for computing the transmission size for each of the plurality of communication channels is not limited to the above.

Next, processing in which the master server 11 transmits the difference information will be described. First, the acquisition unit 42 acquires pieces of the difference information Ln split so as to be related with each of the communication channels from the split difference information storage area 65. Then, the communication unit 23 transmits the acquired pieces of the difference information Ln to the respective communication channels. Subsequently, the acquisition unit 42 acquires the difference information transmission time period of the difference information Ln from the difference information transmission time storage area 64.

Next, the acquisition unit 42 acquires pieces of the split difference information Ln to be transmitted next. More specifically, the acquisition unit 42 acquires the pieces of the split difference information Ln next to the transmitted difference information. Subsequently, the communication unit 23 waits for the difference information transmission time period (for example, 3 sec), after transmitting the difference information Ln. Then, the communication unit 23 transmits the pieces of the difference information Ln to be transmitted next, to the respective communication channels, after waiting for the difference information transmission time period after transmitting the difference information Ln. For example, the communication unit 23 transmits a piece of the difference information split to have a size of 30 B through the communication channel 13*a* and transmits a piece of the difference information split to have a size of 60 B through the communication channel 13*b*. The master server 11 repeatedly executes the above processing for transmitting the difference information.

Accordingly, for example, as illustrated in FIG. 6 and FIG. 7, at the timing when all the previously-transmitted difference information (difference information L1) reaches the slave server 12 and the communication channel 13 (network bandwidth of communication channel 13) empties, the next difference information (difference information L2) is transmitted, and thus, the difference information can be quickly and efficiently transmitted.

When the difference information is transmitted from the master server 11, the slave server 12 updates the replicated data 131 on the basis of the transmitted difference information. Specifically, the communication unit 103 of the slave server 12 receives the transmitted difference information. Subsequently, the replicated data updating unit 122 of the slave server 12 updates the replicated data 131 on the basis of the received difference information. Accordingly, the content of the updated master data 51 can be reflected in the replicated data 131 of the slave server 12.

Finally, processing in which the master server 11 deletes the difference information will be described. First, the updating unit 41 determines whether or not the difference information Ln has been transmitted. When it is determined that the difference information Ln has been transmitted, the updating unit 41 refers to the transmission management table 81 (for example, FIG. 4) and sets the transmitted flag of the communication channel to which the difference information Ln has been transmitted. More specifically, the updating unit 41 changes the transmitted flag from "0" to "1".

Next, the updating unit 41 determines whether or not all the transmitted flags of the difference information Ln are set.

In the example of FIG. 4, the updating unit 41 determines that all the transmitted flags of the difference information "L1" are set. When it is determined that all the transmitted flags of the difference information L1 are set, the updating unit 41 deletes the difference information L1. More specifically, the updating unit 41 deletes the record of the difference information "L1" of the transmission management table 81. In addition, the updating unit 41 deletes information associated with the difference information "L1" stored in each of the difference information storage area 61, the difference information transmission time storage area 64, and the split difference information storage area 65.

Accordingly, the difference information whose transmission to all the slave servers 12 is completed is automatically deleted, and thus, the memory 22 can be efficiently used. On the other hand, when it is determined that not all the transmitted flags of the difference information Ln are set (for example, difference information "L2" and "L3" of FIG. 4), the updating unit 41 does not execute deletion of the difference information.

As described above, in the present exemplary embodiment, the difference information is split so as to be related with each of the communication channels, according to the communication states (for example, transfer time periods) of the communication channels, and the split difference information is transmitted to the slave servers 12, and thus, the plurality of communication channels can be effectively used, and the transmission time period of the difference information can be reduced.

In the present exemplary embodiment, the communication unit 23 is included in each of the slave servers 12, but may be realized by one communication unit 23. In addition, the communication state of the communication channel is not limited to the transfer time period, and may be, for example, a communication speed or the like.

Furthermore, in the present exemplary embodiment, the updating unit 41 performs only update of the master data 51, and the communication unit 23 asynchronously transmits the difference information to the slave servers 12. However, the communication unit 23 may synchronize the timing to transmit the difference information to each of the slave servers 12. For example, the updating unit 41 performs a transmission instruction to the communication unit 23 at arbitrary timing so that the communication unit 23 that receives the transmission instruction immediately transmits the difference information to the slave server 12 without wait time.

[Operation]

Next, the operation of the communication system 1 will be described with reference to FIG. 8 to FIG. 14. First, data update processing of the master server 11 will be described with reference to FIG. 8. The data update processing of the master server 11 is executed when updated data is inputted.

First, the updating unit 41 acquires updated data (Step S1). For example, the updating unit 41 acquires updated data inputted by a user through the input-output unit 24. Next, the updating unit 41 updates the master data 51 stored in the memory 22, on the basis of the updated data acquired in the processing of Step S1 (Step S2).

Subsequently, the updating unit 41 acquires difference information between the pre-update master data and the post-update master data, on the basis of the pre-update master data and the post-update master data (Step S3). Then, the updating unit 41 stores the difference information acquired in the processing of Step S3, in the difference information storage area 61 (Step S4).

After the processing of Step S4, the data update processing of the master server 11 is ended. Accordingly, every time the master data 51 stored in the memory 22 is updated, the difference information is automatically generated.

Figure 9:
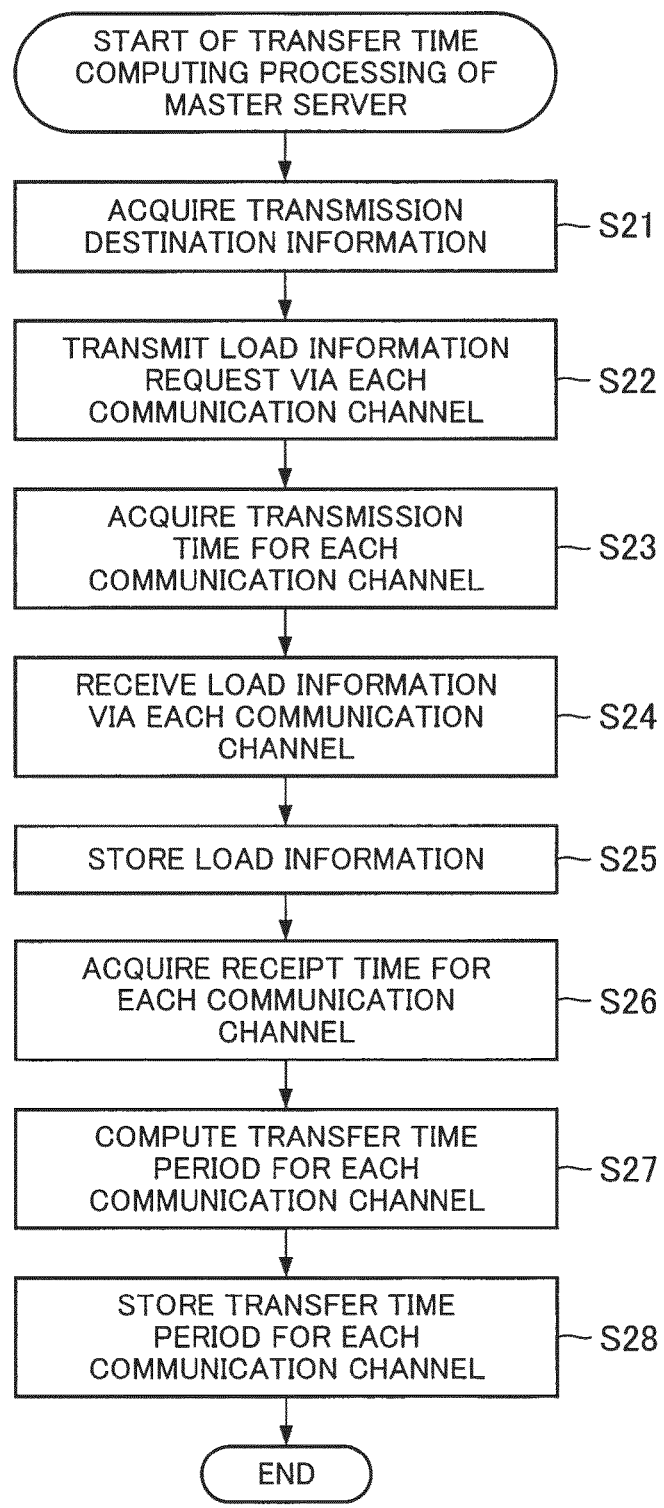
FIG. 9 is a flowchart for explaining transfer time computing processing.
Figure 10:
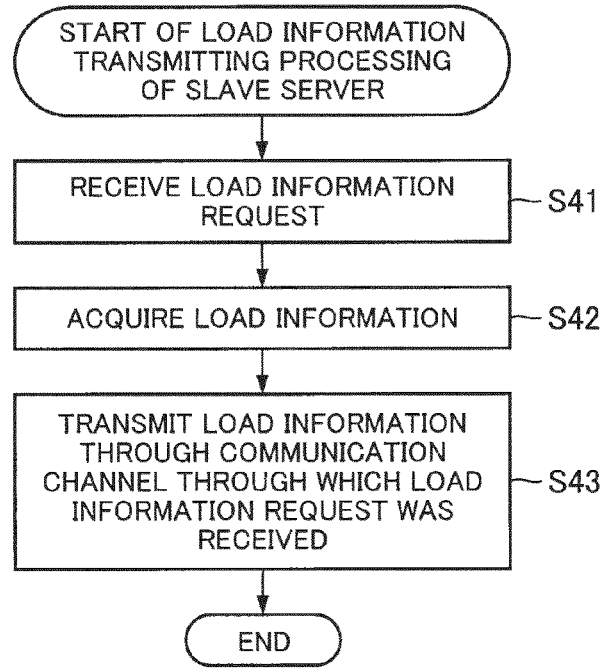
FIG. 10 is a flowchart for explaining load information transmitting processing.

Next, transfer time computing processing will be described with reference to FIG. 9 and FIG. 10. FIG. 9 is a flowchart for explaining transfer time computing processing of the master server 11. FIG. 10 is a flowchart for explaining load information transmitting processing of the slave server 12. The transfer time computing processing of FIG. 9 is executed at arbitrary timing (for example, regularly).

First, the acquisition unit 42 of the master server 11 acquires transmission destination information (Step S21). The acquisition unit 42 acquires, for example, address information of the slave server 12 and information of the plurality of communication channels 13 for communicating with the slave server 12, as the transmission destination information pre-stored in the storage unit 25.

Next, the communication unit 23 of the master server 11 transmits a load information request to the slave server 12 via each of the communication channels (for example, the communication channels 13a and 13b) included in the transmission destination information acquired in the processing of Step S21 (Step S22). The load information request is information for requesting load information (for example, CPU utilization) of the slave server 12.

Subsequently, the acquisition unit 42 of the master server 11 acquires transmission time that indicates time when transmitting the load information request for each of the communication channels (Step S23). When the load information request is transmitted to the slave server 12 by the communication unit 23 of the master server 11 (after executing processing of Step S22), the slave server 12 executes the load information transmitting processing of FIG. 10.

In the load information transmitting processing of FIG. 10, first, the communication unit 103 of the slave server 12 receives the load information request transmitted from the master server 11 (Step S41). Subsequently, the load information acquisition unit 121 of the slave server 12 acquires the load information (for example, the CPU utilization) (Step S42).

Then, the communication unit 103 of the slave server 12 transmits the load information acquired in the processing of Step S42 to the master server 11 through the communication channel through which the load information request has been received in the processing of Step S41 (Step S43). After the processing of Step S43, the load information transmitting processing of FIG. 10 is ended, and the processing proceeds to Step S24 of FIG. 9.

In Step S24 of FIG. 9, the communication unit 23 of the master server 11 receives via each of the communication channels the load information transmitted in the processing of Step S43 of FIG. 10 (Step S24). Subsequently, the storage control unit 44 of the master server 11 stores the received load information in the load information storage area 62 (Step S25).

In addition, the acquisition unit 42 of the master server 11 acquires receipt time that indicates time when receiving the load information in the processing of Step S24 via each of the communication channels (Step S26). Then, the transfer time computing unit 43 of the master server 11 computes transfer time period for each of the communication channels on the basis of the transmission time of each of the communication channels acquired in the processing of Step S23, the receipt time of each of the communication channels acquired in the processing of Step S26, and the size of the load information received in the processing of Step S24 (Step S27). Since the computing method of the transfer time period has been described above with reference to the equations (1) and (2), the specific explanation is omitted.

Finally, the storage control unit 44 stores the transfer time period for each of the communication channels computed in the processing of Step S27, in the transfer time storage area 63 (Step S28). Accordingly, the transfer time period for each of the communication channels as the communication state of each of the communication channels can be stored.

Figure 11:
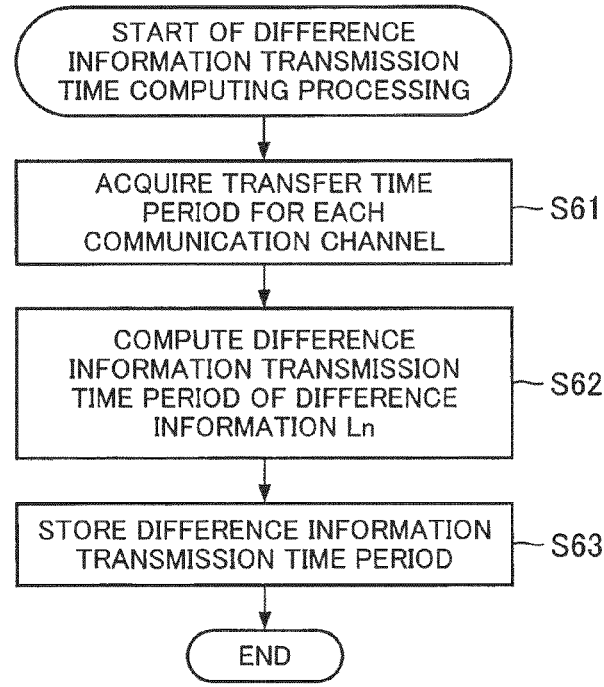
FIG. 11 is a flowchart for explaining difference information transmission time computing processing.

Next, difference information transmission time computing processing of the master server 11 will be described with reference to FIG. 11. The difference information transmission time computing processing of FIG. 11 is executed after computing the transfer time period by the transfer time computing processing of FIG. 9.

First, the acquisition unit 42 acquires the transfer time period for each of the communication channels (Step S61). Specifically, the acquisition unit 42 acquires the transfer time period of each of the communication channels stored in the transfer time storage area 63 in the processing of Step S28 of FIG. 10. Next, the difference information transmission time computing unit 45 computes difference information transmission time period of difference information Ln, on the basis of the transfer time period for each of the communication channels acquired in the processing of Step S61 (Step S62). Since the computing method of the difference information transmission time period has been described above with reference to the equations (3) and (4), the specific explanation is omitted.

Then, the storage control unit 44 stores the difference information transmission time period computed in the processing of Step S62, in the difference information transmission time storage area 64 (Step S63). After the processing of Step S63, the difference information transmission time computing processing of the master server 11 is ended. Accordingly, the difference information transmission time period until the difference information is transmitted from the master server 11 to the slave server 12 (difference information transmission time period) is computed, and therefore, after completing transmission of certain difference information, next difference information can be immediately transmitted.

Figure 12:
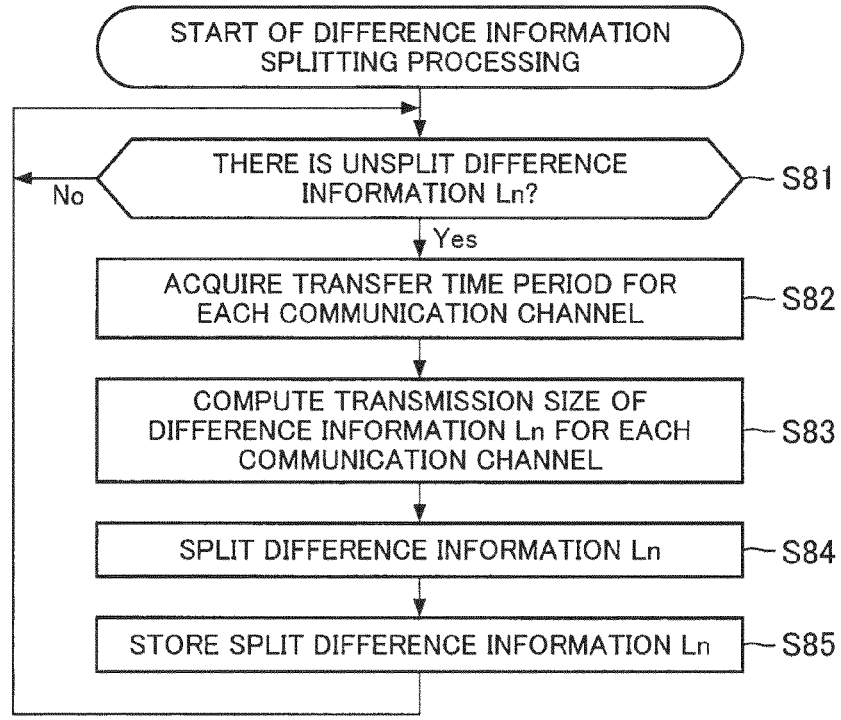
FIG. 12 is a flowchart for explaining difference information splitting processing.
Figure 13:
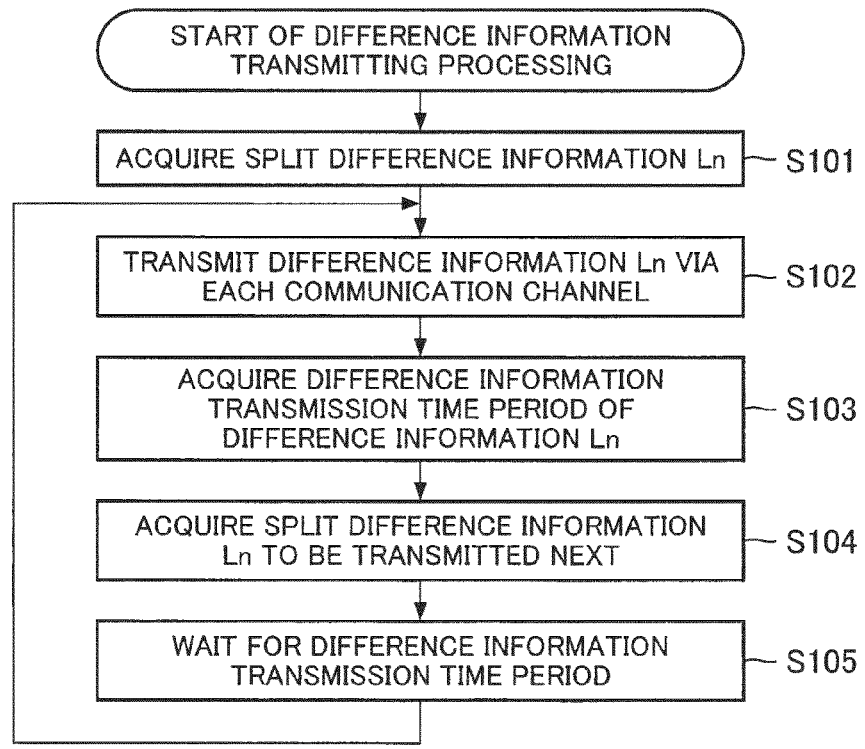
FIG. 13 is a flowchart for explaining difference information transmitting processing.
Figure 14:
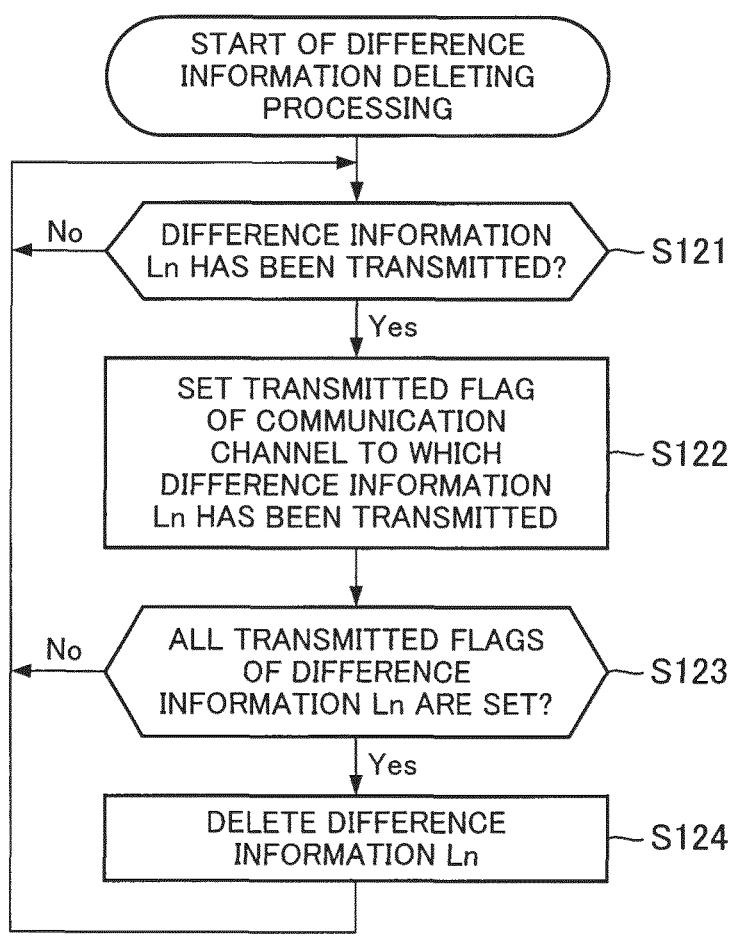
FIG. 14 is a flowchart for explaining difference information deleting processing.

Next, an operation when the master server 11 transmits the difference information will be described with reference to FIG. 12 to FIG. 14. FIG. 12 is a flowchart for explaining difference information splitting processing. FIG. 13 is a flowchart for explaining difference information transmitting processing. FIG. 14 is a flowchart for explaining difference information deleting processing.

First, the difference information splitting processing of FIG. 12 will be described. The difference information transmitting processing of FIG. 12 is started when the master server 11 is activated.

First, the difference information splitting unit 46 refers to the difference information storage area 61 and determines whether or not there is unsplit difference information Ln (Step S81). When there is not the unsplit difference information Ln (Step S81: No), the processing is returned to Step S81 and the processing of Step S81 is repeated. On the other hand, when there is the unsplit difference information Ln (Step S81: Yes), the difference information splitting unit 46 acquires the transfer time period for each of the communication channels from the transfer time storage area 63 (Step S82).

Next, the difference information splitting unit 46 computes a transmission size of the difference information Ln for each of the communication channels (Step S83). Since the computing method of the transmission size has been described above with reference to the equations (5) and (6), the specific explanation is omitted. Then, the difference information splitting unit 46 splits the difference information Ln so as to be related with the communication channels, respectively, on the basis of the transmission size computed in the processing of Step S83 for each of the communication channels (Step S84).

Subsequently, the storage control unit 44 stores the difference information Ln split and related with the communication channels, respectively, in the processing of Step S84, in the split difference information storage area 65 (Step S85). After the processing of Step S85, the processing is returned to Step S81 and the processing thereafter is repeated.

Next, the difference information transmitting processing will be described with reference to FIG. 13. The difference information transmitting processing of FIG. 13 is started when the difference information Ln is split in the processing of Step S84 of FIG. 12 (or when storing the split difference information Ln in the processing of Step S85).

First, the acquisition unit 42 acquires the pieces of the difference information Ln split and related with the communication channels, respectively, in the processing of Step S84 of FIG. 12 (Step S101). The acquisition unit 42 may acquire the pieces of the difference information Ln from the split difference information storage area 65.

Then, the communication unit 23 transmits the pieces of the difference information Ln acquired in the processing of Step S101 to the communication channels, respectively (Step S102). Subsequently, the acquisition unit 42 acquires the difference information transmission time period of the difference information Ln from the difference information transmission time storage area 64 (Step S103).

Next, the acquisition unit 42 acquires pieces of the split difference information Ln to be transmitted next (Step S104). The processing of Step S104 is the same processing as the above-described processing of Step S101. That is, the acquisition unit 42 acquires the pieces of the split difference information Ln next to the difference information acquired in the processing of Step S101.

Then, the communication unit 23 waits for the difference information transmission time period acquired in Step S103, after transmitting the difference information Ln in the processing of Step S102 (Step S105). After the processing of Step S105, the processing is returned to Step S102 and the processing thereafter is repeated.

Specifically, the communication unit 23 transmits the pieces of the difference information Ln to be transmitted next, which is acquired in the processing of Step S104, to communication channel, respectively, after waiting for the difference information transmission time period after transmitting the difference information Ln.

Accordingly, at the timing when all the previously-transmitted difference information reaches the slave server 12 and the communication channel 13 (network bandwidth of communication channel 13) empties, the next difference information is transmitted, and thus, the difference information can be quickly and efficiently transmitted. When the difference information Ln is transmitted to the slave server 12, the replicated data updating unit 122 of the slave server 12 updates the replicated data 131 on the basis of the received difference information.

Next, the difference information deleting processing will be described with reference to FIG. 14. The difference information deleting processing of FIG. 14 is started when the difference information Ln is transmitted in the processing of Step S102 of FIG. 13.

First, the updating unit 41 determines whether or not the difference information Ln has been transmitted (Step S121). When it is determined that the difference information Ln has not been transmitted (Step S121: No), the processing is returned to Step S121 and the processing of Step S121 is repeated. On the other hand, when it is determined that the difference information Ln has been transmitted (Step S121: Yes), the updating unit 41 sets a transmitted flag of the communication channel to which the difference information Ln has been transmitted (Step S122).

Next, the updating unit 41 determines whether or not all the transmitted flags of the difference information Ln are set (Step S123). When it is determined that not all the transmitted flags of the difference information Ln are set (Step S123: No), the processing is returned to Step S121 and the processing thereafter is repeated. On the other hand, when it is determined that all the transmitted flags of the difference information Ln are set (Step S123: Yes), the updating unit 41 deletes the difference information Ln (Step S124). After the processing of Step S124, the processing is returned to Step S121 and the processing thereafter is repeated.

Accordingly, the difference information whose transmission to all the slave servers 12 is completed is automatically deleted, and thus, the memory 22 can be efficiently used.

<Second Exemplary Embodiment>

Figure 15:
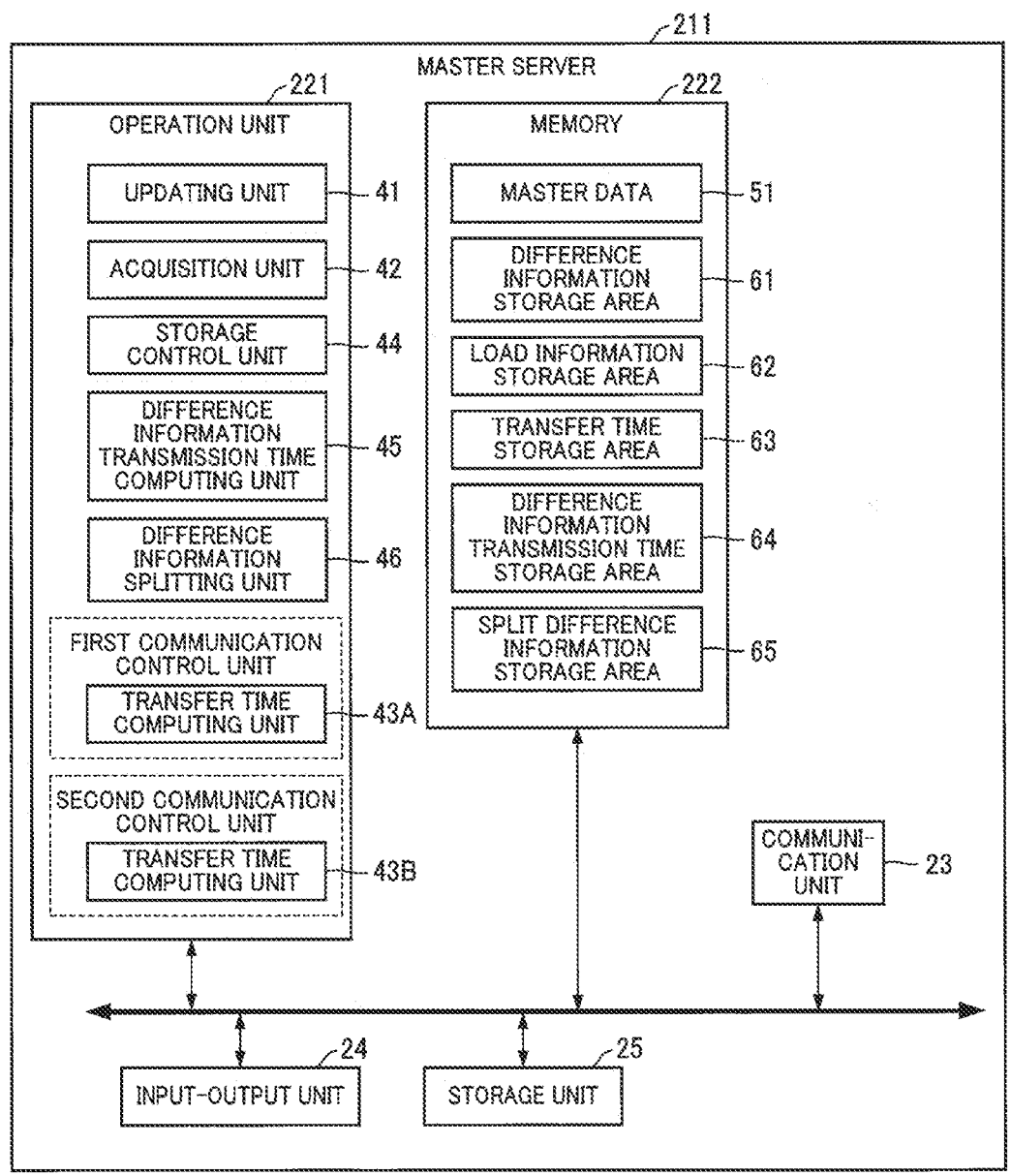
FIG. 15 is a block diagram illustrating a structure of a master server in a second exemplary embodiment of the present invention.
Figure 16:
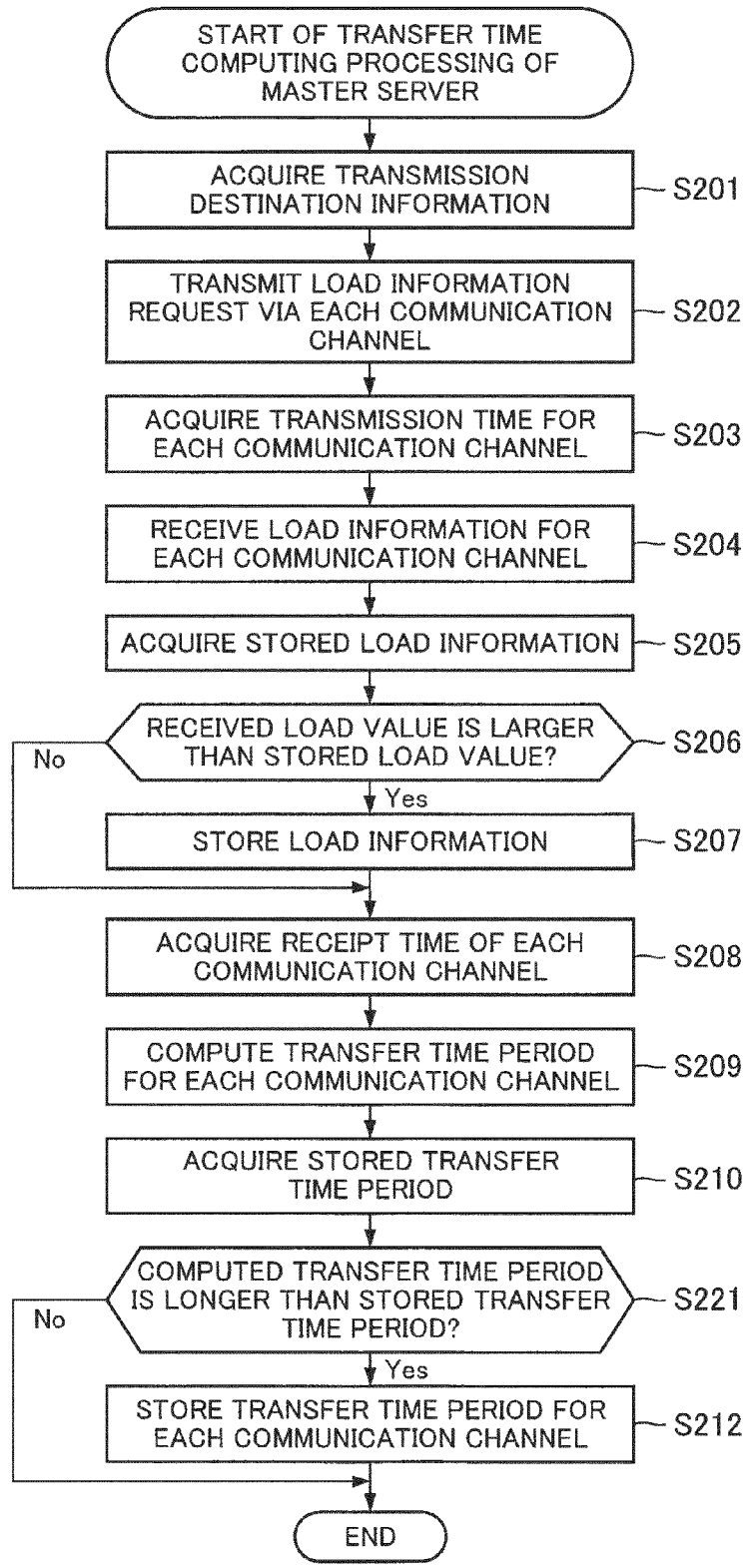
FIG. 16 is a flowchart for explaining transfer time computing processing.
Figure 17:
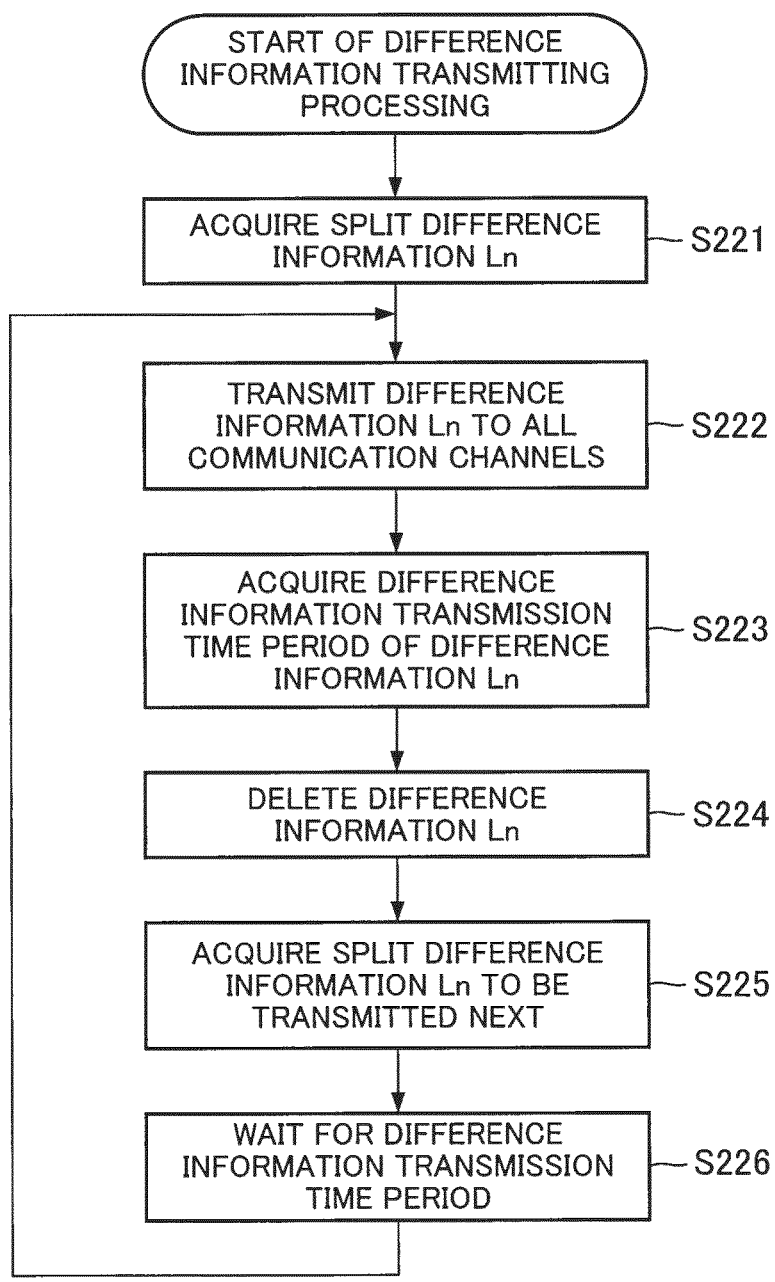
FIG. 17 is a flowchart for explaining difference information transmitting processing.

Next, a second exemplary embodiment of the present invention will be described with reference to FIG. 15 to FIG. 17. A master server 211 of the second exemplary embodiment differs from the master server 11 of the above-described first exemplary embodiment in including one communication unit 23 and multicast-transferring difference information to each of the plurality of slave servers 12 at the same timing. In the master server 211 of the second exemplary embodiment, an element corresponding to that of the master server 11 of the first exemplary embodiment is denoted by the same reference numeral. FIG. 15 is a diagram for explaining a structure of the master server 211. FIG. 16 and FIG. 17 are diagrams for explaining an operation of the master server 211.

[Structure]

First, the structure of the master server 211 will be described with reference to FIG. 15. The master server 211 (information processing device) includes an operation unit 221, a memory 222, the communication unit 23, the input-output unit 24, and the storage unit 25.

The operation unit 221 differs from the operation unit 21 in having one acquisition unit 42, one storage control unit 44, one difference information transmission time computing unit 45, and one difference information splitting unit 46 regardless of the number of the slave servers 12, and other configurations are the same as those of the operation unit 21. In addition, the memory 222 differs from the memory 22 in having one load information storage area 62, one transfer time storage area 63, one difference information transmission time storage area 64, and one split difference information storage area 65 regardless of the number of the slave servers 12, and other configurations are the same as those of the memory 22.

The communication unit 23 transmits the difference information to each of the plurality of slave servers 12 using multicast transfer in which the same data is transmitted while a plurality of destinations are specified. The communication unit 23 transmits the difference information to the plurality of slave servers 12 at one time by multicast, and thus, the amount of data to be transmitted to the communication channels 13 can be reduced, and a network bandwidth can be effectively used.

The difference information is transmitted to the plurality of slave servers 12 at one time, and thus, processing in which the updating unit 41 generates the transmission management table 81 (FIG. 4) in the difference information storage area 61 and sets the transmitted flags is omitted.

In addition, after the communication unit 23 transmits a load information request to the slave server 12 and receives load information from the slave server 12, the acquisition unit 42 acquires load information from the load information storage area 62. Subsequently, each of the communication control units (the transfer time computing unit 43) which controls communication of each of the slave servers 12 determines whether or not a load value indicated by the load information (for example, CPU utilization) that the communication unit 23 received is larger than a load value indicated by the load information that the acquisition unit 42 acquired. Then, when the load value indicated by the received load information is larger than the load value indicated by the acquired load information, the storage control unit 44 stores the received load information in the load information storage area 62. More specifically, the storage control unit 44 updates the load information stored in the load information storage area 62.

Furthermore, the acquisition unit 42 acquires transfer time period from the transfer time storage area 63. Then, after computing the transfer time period, the transfer time computing unit 43 determines whether or not the computed transfer time period is longer than the acquired transfer time period. When the computed transfer time period is longer than the acquired transfer time period, the storage control unit 44 stores the computed transfer time period in the transfer time storage area 63.

In this manner, by storing each of the load information of the slave server 12 whose load value is the largest and the transfer time period that is the longest transfer time period with the slave server 12, after transmitting the difference information to all of the plurality of slave servers 12, the master server 211 can transmit next difference information to the slave servers 12.

[Operation]

Next, the operation of the master server 211 will be described with reference to FIG. 16 and FIG. 17. FIG. 16 is a flowchart for explaining transfer time computing processing. FIG. 17 is a flowchart for explaining difference information transmitting processing.

First, the transfer time computing processing will be described with reference to FIG. 16. The transfer time computing processing of FIG. 16 is executed at arbitrary timing (for example, regularly).

First, the acquisition unit 42 of the master server 211 acquires transmission destination information (Step S201). Next, the communication unit 23 of the master server 211 transmits a load information request to the slave server 12 via each of the communication channels (for example, the communication channels 13a and 13b) included in the transmission destination information acquired in the processing of Step S201 (Step S202).

Subsequently, the acquisition unit 42 of the master server 211 acquires transmission time that indicates time when transmitting the load information request, for each of the communication channels (Step S203). When the load information request is transmitted to the slave server 12 by the communication unit 23 of the master server 211 (after executing processing of Step S202), the slave server 12 executes load information transmitting processing. The load information transmitting processing has been described above with reference to FIG. 10, and therefore, will be simply described.

First, the communication unit 103 of the slave server 12 receives the load information request transmitted from the master server 211 (Step S41). Subsequently, the load information acquisition unit 121 of the slave server 12 acquires load information (Step S42). Then, the communication unit 103 of the slave server 12 transmits the load information to the master server 211 through the communication channel through which the load information request has been received (Step S43). After the processing of Step S43, the load information transmitting processing of FIG. 10 is ended, and the processing proceeds to Step S204 of FIG. 16.

In Step S204 of FIG. 16, the communication unit 23 of the master server 211 receives the load information transmitted in the processing of Step S43 of FIG. 10 for each of the communication channels (Step S204). Subsequently, the acquisition unit 42 of the master server 211 acquires load information stored in the load information storage area 62 (Step S205). When the load information is not yet stored in the load information storage area 62, the processing of Step S207 is executed without executing the processing of Steps S205, S206.

Next, the transfer time computing unit 43 (communication control unit) of the master server 211 determines whether or not a load value (magnitude) indicated by the load information received in the processing of Step S204 is larger than a load value indicated by the stored load information acquired in the processing of Step S205 (Step S206). When it is determined that the received load value is larger than the stored load value (Step S206: Yes), the storage control unit 44 stores the received load information in the load information storage area 62 (Step S207).

On the other hand, when it is determined that the received load value is not larger than the stored load value (the same or smaller) (Step S206: No), the processing proceeds to Step S208 without executing the processing of Step S207.

Then, the acquisition unit 42 of the master server 211 acquires receipt time that indicates time when receiving the load information in the processing of Step S204, for each of the communication channels (Step S208). Subsequently, the transfer time computing unit 43 of the master server 211 computes transfer time period for each of the communication channels on the basis of the transmission time acquired in the processing of Step S203, the receipt time for each of the communication channels acquired in the processing of Step S208, and the size of the load information received in the processing of Step S204 (Step S209). Since the computing method of the transfer time period has been described above with reference to the equations (1) and (2), the specific explanation is omitted.

Subsequently, the acquisition unit 42 of the master server 211 acquires the transfer time period for each of the communication channels stored in the transfer time storage area 63 (Step S210). When the transfer time period is not yet stored in the transfer time storage area 63, the transfer time computing processing is ended without executing the processing of Steps S211 and S212.

Next, the transfer time computing unit 43 of the master server 211 determines whether or not the transfer time period computed in the processing of Step S209 is longer than the stored transfer time period acquired in the processing of Step S210 (Step S211). When it is determined that the computed transfer time period is longer than the stored transfer time period (Step S211: Yes), the storage control unit 44 stores the computed transfer time period for each of the communication channels in the transfer time storage area 63 (Step S212). After the processing of Step S212, the transfer time computing processing is ended.

In this manner, the master server 211 stores each of the load information whose load value is the largest and the transfer time period that is the longest transfer time period with the slave server 12. Accordingly, after transmitting the difference information to all of the plurality of slave servers 12, the master server 211 can transmit next difference information to the slave servers 12.

After the transfer time computing processing of FIG. 16, the master server 211 executes the difference information transmission time computing processing of FIG. 11, and stores difference information transmission time period in the difference information transmission time storage area 64 as is the case in the master server 11. In addition, the master server 211 executes the difference information splitting processing of FIG. 12, and splits the difference information.

After splitting the difference information, the master server 211 starts difference information transmitting processing of FIG. 17. First, the acquisition unit 42 acquires the pieces of the difference information Ln split and related with the communication channels, respectively, in the processing of Step S84 (or Step S85) of FIG. 12. The acquisition unit 42 may acquire the pieces of the difference information Ln from the split difference information storage area 65.

Then, the communication unit 23 transmits the difference information Ln acquired in the processing of Step S101 (Step S222). Specifically, the communication unit 23 transmits the difference information Ln to all the slave servers 12 to which the difference information Ln is transmitted, at the same timing by multicast. Subsequently, the acquisition unit 42 acquires the difference information transmission time period of the difference information Ln from the difference information transmission time storage area 64 (Step S223).

Next, the updating unit 41 deletes the difference information Ln (Step S224). More specifically, the updating unit 41 deletes information associated with the difference information Ln, stored in each of the difference information storage area 61, the difference information transmission time storage area 64, and the split difference information storage area 65.

Next, the acquisition unit 42 acquires the pieces of the split difference information Ln to be transmitted next (Step S225). The processing of Step S225 is the same processing as the above-described processing of Step S221, and the acquisition unit 42 acquires the pieces of the difference information Ln split next to the difference information acquired in the processing of Step S221.

Then, the communication unit 23 waits for the difference information transmission time period acquired in Step S223, after transmitting the difference information Ln in the processing of Step S222 (Step S226). After the processing of Step S226, the processing is returned to Step S222 and the processing thereafter is repeated. Specifically, the communication unit 23 transmits the difference information Ln to be transmitted next, which is acquired in the processing of Step S225, after waiting for the difference information transmission time period after transmitting the difference information Ln.

In this manner, the difference information is transmitted to the plurality of slave servers 12 at one time by multicast, and thus, the amount of data to be transmitted to the communication channels 13 can be reduced, and a network bandwidth can be effectively used.

<Supplementary Notes>

A part or all of the above-described exemplary embodiments can also be described as the following supplementary notes. Hereinafter, an outline of structures of the information processing device and the like in the present invention will be described. However, the present invention is not limited to the following structures.

(Supplementary Note 1)

An information processing device including:

an updating means for acquiring update information, updating data pre-stored in a storage unit, and acquiring difference information between the pre-update data and the post-update data;

a communication state acquisition means for acquiring a communication state of each of a plurality of communication channels to communicate with another information processing device storing the pre-update data;

a difference information splitting means for, based on the communication state of each of the plurality of communication channels acquired by the communication state acquisition means, splitting the difference information, which is acquired by the updating means, so as to be related with each of the communication channels; and a transmission means for transmitting pieces of the difference information split by the difference information splitting means to the another information processing device through the communication channels related with the pieces of the split difference information, respectively.

Accordingly, the communication state of each of the communication channels is acquired, and the difference information is split so as to be related with each of the communication channels on the basis of the acquired communication state and is transmitted to the another information processing device through each of the plurality of communication channels, and thus, the plurality of communication channels can be effectively used, and transfer time period of the difference information can be shortened.

(Supplementary Note 2)

The information processing device according to supplementary note 1, wherein the communication state acquisition means computes, as the communication state, transfer time period when transmitting information having a preset size, for each of the plurality of communication channels, and, based on a ratio of the transfer time period for each of the communication channels computed by the communication state acquisition means, the difference information splitting means splits the difference information, which is acquired by the updating means, so as to be related with each of the communication channels.

Accordingly, the transfer time period when transmitting information having a prefixed size, in each of the plurality of communication channels, is computed, and the difference information is split on the basis of the ratio of the computed transfer time period for each of the communication channels. Therefore, the difference information split to have an appropriate size according to the transfer time period for each of the communication channels is transmitted, and thus, the plurality of communication channels can be efficiently used.

(Supplementary Note 3)

The information processing device according to supplementary note 2, wherein, based on the ratio of the transfer time period for each of the communication channels computed by the communication state acquisition means, the difference information splitting means splits the difference information so as to be related with each of the communication channels such that a size of a piece of the difference information becomes smaller as the transfer time period becomes longer and the size of the piece of the difference information becomes larger as the transfer time period becomes shorter.

Accordingly, the difference information is split such that the size of the difference information becomes smaller as the transfer time period becomes longer and the size of the difference information becomes larger as the transfer time period becomes shorter, and thus, a communication channel having higher transmission capacity can transmit larger difference information, and the plurality of communication channels can be efficiently used.

(Supplementary Note 4)

The information processing device according to supplementary note 3, wherein, while associating one communication channel whose transfer time period is the n-th (n is an integer) shortest and another communication channel whose transfer time period is the n-th longest with each other, the difference information splitting means computes the size of the piece of the difference information to be transmitted via the one communication channel by dividing the transfer time period of the another communication channel by the sum of the transfer time periods of the plurality of communication channels and by multiplying the value by the size of the difference information, computes the size of the piece of the difference information to be transmitted via the another communication channel by dividing the transfer time period for the one communication channel by the sum of the transfer time periods for the plurality of communication channels and by multiplying the value by the size of the difference information, and splits the difference information into the computed sizes of the pieces of the difference information to be transmitted via the communication channels, respectively.

Accordingly, while associating two communication channels in the plurality of communication channels with each other, the size of the difference information to be transmitted by the one communication channel is computed by dividing the transfer time period of the another communication channel by the sum of the transfer time periods of the plurality of communication channels and by multiplying the value by the size of the difference information, and the size of the difference information to be transmitted by the another communication channel is computed by dividing the transfer time period of the one communication channel by the sum of the transfer time periods of the plurality of communication channels and by multiplying the value by the size of the difference information. Therefore, the difference information having an appropriate size according to the transfer time period of the communication channel can be transmitted through the communication channel.

(Supplementary Note 5)

The information processing device according to any one of supplementary notes 2 to 4, including:

a difference information transmission time computing means for computing a communication speed of an entirety of the plurality of communication channels, based on the transfer time period computed by the communication state acquisition means for each of the communication channels, and computing difference information transmission time period, based on the computed communication speed and the size of the difference information transmitted by the transmission means, wherein, after waiting for the difference information transmission time period computed by the difference information transmission time computing means after transmitting each of the pieces of the split difference information, the transmission means transmits, to the another information processing device, the pieces of the split difference information to be transmitted next through the communication channels related with the pieces of the split difference information, respectively.

Accordingly, when all the previously-transmitted difference information reaches the another information processing device and each of the communication channels 13 empties, the next difference information is transmitted, and thus, each of the communication channels can be effectively used.

(Supplementary Note 6)

The information processing device according to supplementary note 5, wherein the communication state acquisition means acquires load information that indicates a size of a load of the another information processing device, and the difference information transmission time computing means computes the difference information transmission time period depending on the size of the load indicated by the load information acquired by the communication state acquisition means.

Accordingly, for example, the difference information transmission time period becomes longer as the size of the load of the another information processing device becomes bigger, and thus, the difference information can be transmitted without putting an extra load on the another information processing device.

(Supplementary Note 7)

A program, in an information processing device, for achieving:

an updating means for acquiring update information, updating data pre-stored in a storage unit, and acquiring difference information between the pre-update data and the post-update data;

a communication state acquisition means for acquiring a communication state of each of a plurality of communication channels to communicate with another information processing device storing the pre-update data;

a difference information splitting means for, based on the communication state of each of the plurality of communication channels acquired by the communication state acquisition means, splitting the difference information, which is acquired by the updating means, so as to be related with each of the communication channels; and a transmission means for transmitting each of pieces of the difference information split by the difference information splitting means to the another information processing device through the communication channels related with the pieces of the split difference information, respectively.

(Supplementary Note 8)

The program according to supplementary note 7, wherein the communication state acquisition means computes, as the communication state, transfer time period when transmitting information having a preset size, for each of the plurality of communication channels, and, based on a ratio of the transfer time period for each of the communication channels computed by the communication state acquisition means, the difference information splitting means splits the difference information, which is acquired by the updating means, so as to be related with each of the communication channels.

(Supplementary Note 9)

An information processing method including:

acquiring update information, updating data pre-stored in a storage unit, and acquiring difference information between the pre-update data and the post-update data;

acquiring a communication state of each of a plurality of communication channels to communicate with another information processing device storing the pre-update data;

based on the acquired communication state of each of the plurality of communication channels, splitting the acquired difference information so as to be related with each of the communication channels; and transmitting pieces of the split difference information to the another information processing device through the communication channels related with the pieces of the difference information split while being associated with each of the communication channels, respectively.

(Supplementary Note 10)

The information processing method according to supplementary note 9, including:

computing, as the communication state, transfer time period when transmitting information having a preset size, for each of the plurality of communication channels, and, based on a ratio of the computed transfer time period for each of the communication channels, splitting the acquired difference information so as to be related with the communication channels, respectively.

The program described in each of the above-described exemplary embodiments and supplementary notes is stored in a storage device, or stored in a computer-readable storage medium. For example, the storage medium is a medium having portability, such as a flexible disk, an optical disk, a magneto optical disk, and a semiconductor memory.

Heretofore, the invention of the present application has been described with reference to each of the above-described exemplary embodiments, but the invention of the present application is not limited to the above-described exemplary embodiments. With respect to the configuration and details of the invention of the present application, various changes which those skilled in the art can understand may be made within the scope of the invention of the present application.

The present invention claims priority based on Japanese Patent Application No. 2012-242441 filed on Nov. 2, 2012, and the entire contents described in the patent application are incorporated herein by reference.

REFERENCE SIGNS LIST 1 communication system
11 master server
12 slave server
13 communication channel
21 operation unit
22 memory
23 communication unit
24 input-output unit
25 storage unit
41 updating unit
42 acquisition unit
43 transfer time computing unit
44 storage control unit
45 difference information transmission time computing unit
46 difference information splitting unit
51 master data
61 difference information storage area
62 load information storage area
63 transfer time storage area
64 difference information transmission time storage area
65 split difference information storage area
101 operation unit
102 memory
103 communication unit
121 load information acquisition unit
122 replicated data updating unit
131 replicated data

What is claimed is:

1. An information processing device comprising:
hardware, including a processor and memory;
an updating unit implemented at least by the hardware and that acquires update information, updates data pre-stored in a storage unit, and acquires difference information between the pre-update data and the post-update data;
a communication state acquisition unit implemented at least by the hardware and that acquires a communication state of each of a plurality of communication channels to communicate with another information processing device storing the pre-update data;
a difference information splitting unit implemented at least by the hardware and that, based on the communication state of each of the plurality of communication channels acquired by the communication state acquisition unit, splits the difference information, which is acquired by the updating unit, so as to be related with each of the communication channels; and
a transmission unit implemented at least by the hardware and that transmits pieces of the difference information split by the difference information splitting unit to the another information processing device through the communication channels related with the pieces of the split difference information, respectively, wherein
the communication state acquisition unit computes, as the communication state, transfer time period when transmitting information having a preset size, for each of the plurality of communication channels, and,
based on a ratio of the transfer time period for each of the communication channels computed by the communication state acquisition unit, the difference information splitting unit splits the difference information, which is acquired by the updating unit, so as to be related with each of the communication channels.

2. The information processing device according to claim 1, wherein,
based on the ratio of the transfer time period for each of the communication channels computed by the communication state acquisition unit, the difference information splitting unit splits the difference information so as to be related with each of the communication channels such that a size of a piece of the difference information becomes smaller as the transfer time period becomes longer and the size of the piece of the difference information becomes larger as the transfer time period becomes shorter.

3. The information processing device according to claim 2, wherein,
while associating one communication channel whose transfer time period is the n-th (n is an integer) shortest and another communication channel whose transfer time period is the n-th longest with each other, the difference information splitting unit computes the size of the piece of the difference information to be transmitted via the one communication channel by dividing the transfer time period of the another communication channel by the sum of the transfer time periods of the plurality of communication channels and by multiplying the value by the size of the difference information, computes the size of the piece of the difference information to be transmitted via the another communication channel by dividing the transfer time period for the one communication channel by the sum of the transfer time periods for the plurality of communication channels, and by multiplying the value by the size of the difference information, and splits the difference information into the computed sizes of the pieces of the difference information to be transmitted via the communication channels, respectively.

4. The information processing device according to claim 1, comprising:
a difference information transmission time computing unit implemented at least by the hardware and that computes a communication speed of an entirety of the plurality of communication channels, based on the transfer time period computed by the communication state acquisition unit for each of the communication channels, and computes difference information transmission time period, based on the computed communication speed and the size of the difference information transmitted by the transmission unit, wherein,
after waiting for the difference information transmission time period computed by the difference information transmission time computing unit after transmitting each of the pieces of the split difference information, the transmission unit transmits, to the another information processing device, the pieces of the split difference information to be transmitted next through the communication channels related with the pieces of the split difference information, respectively.

5. The information processing device according to claim 4, wherein
the communication state acquisition unit acquires load information that indicates a size of a load of the another information processing device, and
the difference information transmission time computing unit computes the difference information transmission time period depending on the size of the load indicated by the load information acquired by the communication state acquisition unit.

6. A non-transitory computer readable medium storing a program, in an information processing device, for achieving:
an updating unit that acquires update information, updates data pre-stored in a storage unit, and acquires difference information between the pre-update data and the post-update data;
a communication state acquisition unit that acquires a communication state of each of a plurality of communication channels to communicate with another information processing device storing the pre-update data;
a difference information splitting unit that, based on the communication state of each of the plurality of communication channels acquired by the communication state acquisition unit, splits the difference information, which is acquired by the updating unit, so as to be related with each of the communication channels; and
a transmission unit that transmits each of pieces of the difference information split by the difference information splitting unit to the another information processing device through the communication channels related with the pieces of the split difference information, respectively, wherein
the communication state acquisition unit computes, as the communication state, transfer time period when transmitting information having a preset size, for each of the plurality of communication channels, and,
based on a ratio of the transfer time period for each of the communication channels computed by the communication state acquisition unit, the difference information splitting unit splits the difference information, which is acquired by the updating unit, so as to be related with each of the communication channels.

7. An information processing method comprising:
acquiring update information, updating data pre-stored in a storage unit, and acquiring difference information between the pre-update data and the post-update data;
acquiring a communication state of each of a plurality of communication channels to communicate with another information processing device storing the pre-update data;
based on the acquired communication state of each of the plurality of communication channels, splitting the acquired difference information so as to be related with each of the communication channels;
transmitting pieces of the split difference information to the another information processing device through the communication channels related with the pieces of the difference information split while being associated with each of the communication channels, respectively;
computing, as the communication state, transfer time period when transmitting information having a preset size, for each of the plurality of communication channels; and,
based on a ratio of the computed transfer time period for each of the communication channels, splitting the acquired difference information so as to be related with the communication channels, respectively.

* * * * *